US012148210B2

(12) United States Patent
Imoto et al.

(10) Patent No.: US 12,148,210 B2
(45) Date of Patent: Nov. 19, 2024

(54) INFORMATION PROCESSING METHOD, INFORMATION PROCESSING DEVICE, NON-TRANSITORY COMPUTER-READABLE RECORDING MEDIUM RECORDING INFORMATION PROCESSING PROGRAM, AND INFORMATION PROCESSING SYSTEM

(71) Applicant: Panasonic Intellectual Property Corporation of America, Torrance, CA (US)

(72) Inventors: Junichi Imoto, Osaka (JP); Yukie Shoda, Osaka (JP); Masahiro Iwasaki, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 818 days.

(21) Appl. No.: 17/235,389

(22) Filed: Apr. 20, 2021

(65) Prior Publication Data
US 2021/0240991 A1    Aug. 5, 2021

Related U.S. Application Data

(63) Continuation of application No. PCT/JP2019/041021, filed on Oct. 18, 2019.
(Continued)

(51) Int. Cl.
*G06V 20/40* (2022.01)
*G06N 20/00* (2019.01)
(Continued)

(52) U.S. Cl.
CPC .............. *G06V 20/40* (2022.01); *G06N 20/00* (2019.01); *G06T 7/20* (2013.01); *G06V 20/56* (2022.01);
(Continued)

(58) Field of Classification Search
CPC ........ G06V 20/40; G06V 20/56; G06V 20/44; G06V 20/41; G06N 20/00; G06N 3/02;
(Continued)

(56) References Cited

U.S. PATENT DOCUMENTS 9,457,754 B1    10/2016 Christensen et al.
2011/0254676 A1    10/2011 Marumoto
(Continued)

FOREIGN PATENT DOCUMENTS

| CN | 102592412 A | 7/2012 |
| CN | 104504903 A | 4/2015 |

(Continued)

OTHER PUBLICATIONS

International Search Report (including English Language Translation), mailed Dec. 24, 2019 by the Japan Patent Office (JPO), in International Application No. PCT/JP2019/041021.

*Primary Examiner* — Bobbak Safaipour
(74) *Attorney, Agent, or Firm* — Greenblum & Bernstein, P.L.C.

(57) ABSTRACT

A dashboard camera acquires video data from a camera that captures the surroundings of a vehicle, acquires sensor data including at least one of acceleration, speed, and angular velocity of the vehicle, gives time information indicating time of acquisition to each of the video data and the sensor data, and transmits the sensor data to a data analysis server when an event occurs in the vehicle, the data analysis server identifies the content of the event occurred in the vehicle based on the sensor data and transmits an identification result to the dashboard camera, and when the identified event is determined to be the predetermined event, the dashboard camera specifies video data to which time information same as the time information given to the sensor data
(Continued)

used for the identification is given, and transmits the specified video data to a video accumulation server.

8 Claims, 12 Drawing Sheets

Related U.S. Application Data

(60) Provisional application No. 62/748,747, filed on Oct. 22, 2018.

(51) Int. Cl.
*G06T 7/20* (2017.01)
*G06V 20/56* (2022.01)

(52) U.S. Cl.
CPC ............ *G06T 2207/10016* (2013.01); *G06T 2207/30252* (2013.01); *G06V 20/44* (2022.01)

(58) Field of Classification Search
CPC ............ G06T 7/20; G06T 2207/10016; G06T 2207/30252; B60R 21/00; G07C 5/02; H04N 7/18

See application file for complete search history.

(56) References Cited

U.S. PATENT DOCUMENTS

| | | | |
|---|---|---|---|
| 2018/0137698 A1 | 5/2018 | Yasuda | |
| 2018/0276485 A1* | 9/2018 | Heck | G06N 7/01 |
| 2018/0300964 A1* | 10/2018 | Lakshamanan | G06F 9/5027 |
| 2019/0275946 A1* | 9/2019 | Hirata | G08G 1/16 |
| 2020/0043341 A1* | 2/2020 | Shoda | G08G 1/0137 |
| 2020/0252577 A1* | 8/2020 | Teruuchi | G11B 27/031 |
| 2021/0295441 A1* | 9/2021 | Mullen | G08G 1/205 |
| 2024/0048649 A1* | 2/2024 | Vaananen | H04M 3/527 |

FOREIGN PATENT DOCUMENTS

| | | |
|---|---|---|
| JP | 2011-227701 A | 11/2011 |
| JP | 2018-078500 A | 5/2018 |
| JP | 2018-125777 A | 8/2018 |
| WO | 2016/170934 A1 | 10/2016 |

* cited by examiner

INFORMATION PROCESSING METHOD, INFORMATION PROCESSING DEVICE, NON-TRANSITORY COMPUTER-READABLE RECORDING MEDIUM RECORDING INFORMATION PROCESSING PROGRAM, AND INFORMATION PROCESSING SYSTEM

TECHNICAL FIELD

The present disclosure relates to a technique for processing sensor data acquired by a sensor installed in a vehicle.

BACKGROUND ART

Conventionally, there has been known a dashboard camera that determines that a dangerous situation has occurred when the acceleration of a vehicle exceeds a predetermined threshold value and stores image information captured before and after the time point when the dangerous situation occurred. However, the image information stored in the dashboard camera sometimes include image information in which no dangerous situation has actually occurred.

Therefore, for example, Patent Literature 1 discloses an imaging device in which an image captured by an imaging unit is input to a neural network learned by an image including a processing object, whether or not the processing object is included in the image captured in the imaging unit is determined based on the output from the neural network, and when a determination is made that the processing object is included in the image, the image captured in the imaging unit is transmitted.

However, in the conventional technique described above, the data amount of image data used in the imaging device is large, and the processing load of the imaging device is large, thereby requiring further improvement.

CITATION LIST

Patent Literature

Patent Literature 1: JP 2018-125777 A

SUMMARY OF INVENTION

The present disclosure has been made to solve the above problem, and an object thereof is to provide a technique capable of reducing the processing load of an information processing system.

An information processing method according to an aspect of the present disclosure is an information processing method in an information processing system, the information processing method including: acquiring video data from a camera that captures surroundings of a vehicle; acquiring sensor data including at least one of acceleration, speed, and angular velocity of the vehicle; giving time information indicating time of acquisition to each of the video data and the sensor data; identifying a content of an event occurred in the vehicle based on the sensor data; determining whether or not the identified event is a predetermined event; when the identified event is determined to be the predetermined event, specifying video data to which time information same as time information given to the sensor data used for identification is given; and transmitting the specified video data.

According to the present disclosure, since the content of an event occurred in the vehicle is identified based on sensor data having a smaller amount of data than video data, the processing load of the information processing system can be reduced. Since only the video data when a predetermined event occurred is transmitted, unnecessary video data is prevented from being transmitted, and the data communication amount and data communication cost can be reduced.

Figure 1:
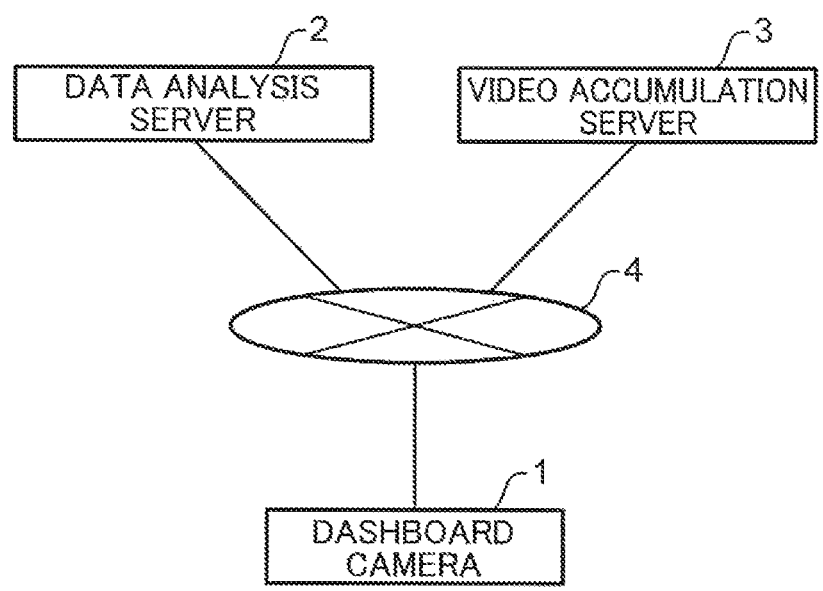
FIG. 1 is a diagram conceptually showing the overall configuration of an information processing system according to a first embodiment.

DESCRIPTION OF EMBODIMENTS (Knowledge Underlying Present Disclosure)

In general, image data has a large amount of data. Therefore, in the conventional technique described above, the amount of learning data necessary for achieving practical accuracy increases, and the learning time may become very long. When image data having a large data amount is treated as input data, it is necessary to create a complicated model in order to achieve practical accuracy.

Therefore, in the conventional technique described above, the image data used in the imaging device is large in data amount, and the processing load of the imaging device becomes large.

In order to solve the above problems, an information processing method according to an aspect of the present disclosure is an information processing method in an information processing system, the information processing method including: acquiring video data from a camera that captures surroundings of a vehicle; acquiring sensor data including at least one of acceleration, speed, and angular velocity of the vehicle; giving time information indicating time of acquisition to each of the video data and the sensor data; identifying a content of an event occurred in the vehicle based on the sensor data; determining whether or not the identified event is a predetermined event; when the identified event is determined to be the predetermined event, specifying video data to which time information same as time information given to the sensor data used for identification is given; and transmitting the specified video data.

According to this configuration, since the content of an event occurred in the vehicle is identified based on sensor data having a smaller amount of data than video data, the processing load of the information processing system can be reduced. Since only the video data when a predetermined event occurred is transmitted, unnecessary video data is prevented from being transmitted, and the data communication amount and data communication cost can be reduced.

In the information processing method described above, in identification of the event, a content of the event may be identified by inputting the sensor data to an identification model generated by machine learning with the sensor data as input and the content of the event as output.

According to this configuration, the content of an event is identified by inputting sensor data to the identification model generated by machine learning with the sensor data as input and the content of the event as output. When video data is used as input data of the identification model, since the video data has a large data amount, for achieving practical accuracy, the identification model becomes a complicated model, the data amount of input data necessary for learning increases, and the learning time of the identification model also becomes long. On the other hand, when sensor data is used as input data of the identification model, since the sensor data has an amount of data smaller than that of the video data, the identification model becomes a simple model, the data amount of input data necessary for learning can be reduced, and the learning time of the identification model can also be shortened.

In the information processing method described above, the predetermined event may include at least one of an event indicating dangerous driving, an event indicating collision of the vehicle, an event indicating a road maintenance state, and an event indicating a malfunction of the vehicle.

According to this configuration, it is possible to accumulate at least one of video data when an event indicating dangerous driving occurs, video data when an event indicating collision of a vehicle occurs, video data when an event indicating a road maintenance state occurs, and video data when an event indicating a malfunction of the vehicle occurs.

In the information processing method described above, the information processing method may further include determining whether or not the event has occurred based on the sensor data, and when determination is made in the event identification that the event has occurred, a content of the event occurred in the vehicle may be identified based on the sensor data.

According to this configuration, first, whether or not an event has occurred is determined based on the sensor data. Then, when it is determined that an event has occurred, the event occurred in the vehicle is identified based on the sensor data. Therefore, since the content of the event is not identified based on all the sensor data, but the content of the event is identified based only on the sensor data when it is determined that the event has occurred, the time required for the identification processing can be shortened.

In the information processing method described above, the information processing system may include a mobile terminal attachable and detachable to and from the vehicle, and the sensor data may be acquired from the mobile terminal attached to the vehicle in acquisition of the sensor data, the information processing method may further include acquiring an attitude of the mobile terminal, and correcting the acquired sensor data based on the acquired attitude.

The attitude of the mobile terminal attachable and detachable to and from the vehicle is likely to change every time the mobile terminal is attached to the vehicle. However, according to the above configuration, the attitude of the mobile terminal is acquired, and the acquired sensor data is corrected based on the acquired attitude. Therefore, the video data and the sensor data can be acquired using the mobile terminal.

In the information processing method described above, the information processing system may include a terminal device mounted on the vehicle and a server communicably connected to the terminal device, the terminal device may transmit the acquired sensor data to the server, the server may receive the sensor data, in identification of the event, the server may identify a content of an event occurred in the vehicle based on the sensor data, the server may transmit an identification result, the terminal device may receive the identification result transmitted by the server, and in the determination, the terminal device may determine whether or not the identified event indicated by the identification result is a predetermined event.

According to this configuration, since not the terminal device mounted on the vehicle but the server on the network identifies the content of the event occurred in the vehicle based on the sensor data, the software necessary for the identification processing can be easily updated, and the burden on the user can be reduced.

An information processing device according to another aspect of the present disclosure includes: a video data acquisition unit that acquires video data from a camera that captures surroundings of a vehicle; a sensor data acquisition unit that acquires sensor data including at least one of acceleration, speed, and angular velocity of the vehicle; a time information giving unit that gives time information Indicating time of acquisition to each of the video data and the sensor data; an identification unit that identifies a content of an event occurred in the vehicle based on the sensor data; a determination unit that determines whether or not the identified event is a predetermined event; a specification unit that specifies video data to which time information same as time information given to the sensor data used for identification is given, when the identified event is determined to be the predetermined event; and a transmission unit that transmits the specified video data.

According to this configuration, since the content of an event occurred in the vehicle is identified based on sensor data having a smaller amount of data than video data, the processing load of the information processing device can be reduced. Since only the video data when a predetermined event occurred is transmitted, unnecessary video data is prevented from being transmitted, and the data communication amount and data communication cost can be reduced.

A non-transitory computer-readable recording medium recording an information processing program according to another aspect of the present disclosure causes a computer to function as: a video data acquisition unit that acquires video data from a camera that captures surroundings of a vehicle; a sensor data acquisition unit that acquires sensor data including at least one of acceleration, speed, and angular velocity of the vehicle; a time information giving unit that gives time information indicating time of acquisition to each of the video data and the sensor data; an identification unit that identifies a content of an event occurred in the vehicle based on the sensor data; a determination unit that determines whether or not the identified event is a predetermined event; a specification unit that specifies video data to which time information same as time information given to the sensor data used for identification is given, when the identified event is determined to be the predetermined event; and a transmission unit that transmits the specified video data.

According to this configuration, since the content of an event occurred in the vehicle is identified based on sensor data having a smaller amount of data than video data, the processing load of the computer can be reduced. Since only the video data when a predetermined event occurred is transmitted, unnecessary video data is prevented from being transmitted, and the data communication amount and data communication cost can be reduced.

An information processing system according to another aspect of the present disclosure is an information processing system including a terminal device mounted on a vehicle, a data analysis server communicably connected with the terminal device, and a video accumulation server communicably connected with the terminal device, wherein the terminal device includes a video data acquisition unit that acquires video data from a camera that captures surroundings of a vehicle, a sensor data acquisition unit that acquires sensor data including at least one of acceleration, speed, and angular velocity of the vehicle, a time information giving unit that gives time information indicating time of acquisition to each of the video data and the sensor data; and a sensor data transmission unit that transmits the sensor data to the data analysis server when an event occurs in the vehicle, the data analysis server includes a sensor data reception unit that receives the sensor data transmitted by the terminal device, an identification unit that identifies a content of an event occurred in the vehicle based on the sensor data, and an identification result transmission unit that transmits an identification result, the terminal device includes an identification result reception unit that receives the identification result transmitted by the data analysis server, a determination unit that determines whether or not the identified event indicated by the identification result is a predetermined event, a specification unit that specifies video data to which time information same as time information given to the sensor data used for identification is given, when the identified event is determined to be the predetermined event, and a video data transmission unit that transmits the specified video data to the video accumulation server, and the video accumulation server includes a video data reception unit that receives the video data transmitted by the terminal device, and a video data storage unit that stores the video data.

According to this configuration, since the content of an event occurred in the vehicle is identified based on sensor data having a smaller amount of data than video data, the processing load of the information processing system can be reduced. Since only the video data when a predetermined event occurred is transmitted, unnecessary video data is prevented from being transmitted, and the data communication amount and data communication cost can be reduced.

Embodiments of the present disclosure will be described below with reference to the accompanying drawings. The following embodiments are examples of embodiments of the present disclosure, and are not intended to limit the technical scope of the present disclosure.

First Embodiment

FIG. 1 is a diagram conceptually showing the overall configuration of the information processing system according to the first embodiment.

The information processing system shown in FIG. 1 includes a dashboard camera 1, a data analysis server 2, and a video accumulation server 3. The dashboard camera 1 is an example of a terminal device and is mounted on a vehicle. The data analysis server 2 is an example of a server, and is communicably connected with the dashboard camera 1 via a network 4. The network 4 is the Internet, for example. The video accumulation server 3 is communicably connected with the dashboard camera 1 via the network 4.

The dashboard camera 1 acquires video data in which the traveling direction of the vehicle is captured. The dashboard camera 1 acquires sensor data including at least one of the acceleration, speed, and angular velocity of the vehicle. The dashboard camera 1 gives a time stamp to video data and sensor data. The dashboard camera 1 stores video data and sensor data to which a time stamp is given. When an event occurs, the dashboard camera 1 transmits, to the data analysis server 2, a sensor data group of a third period including a first period from the time point when the event occurred to a predetermined time before and a second period from the time point when the event occurred to a predetermined time later. When the occurred event is determined to be the predetermined event, the dashboard camera 1 transmits the stored video data group to the video accumulation server 3.

The data analysis server 2 identifies the content of the event occurred in the vehicle based on the sensor data received from the dashboard camera 1. Specifically, the data analysis server 2 inputs the sensor data group received from the dashboard camera 1 into an identification model generated by machine learning, and acquires, as an identification result, the content of the event output from the identification model. The data analysis server 2 transmits the identification result to the dashboard camera 1.

The video accumulation server 3 stores video data transmitted by the dashboard camera 1. Specifically, the video accumulation server 3 stores a video data group when a predetermined event occurs.

Hereinafter, the configuration of the dashboard camera 1, the data analysis server 2, and the video accumulation server 3 will be described in detail.

Figure 2:
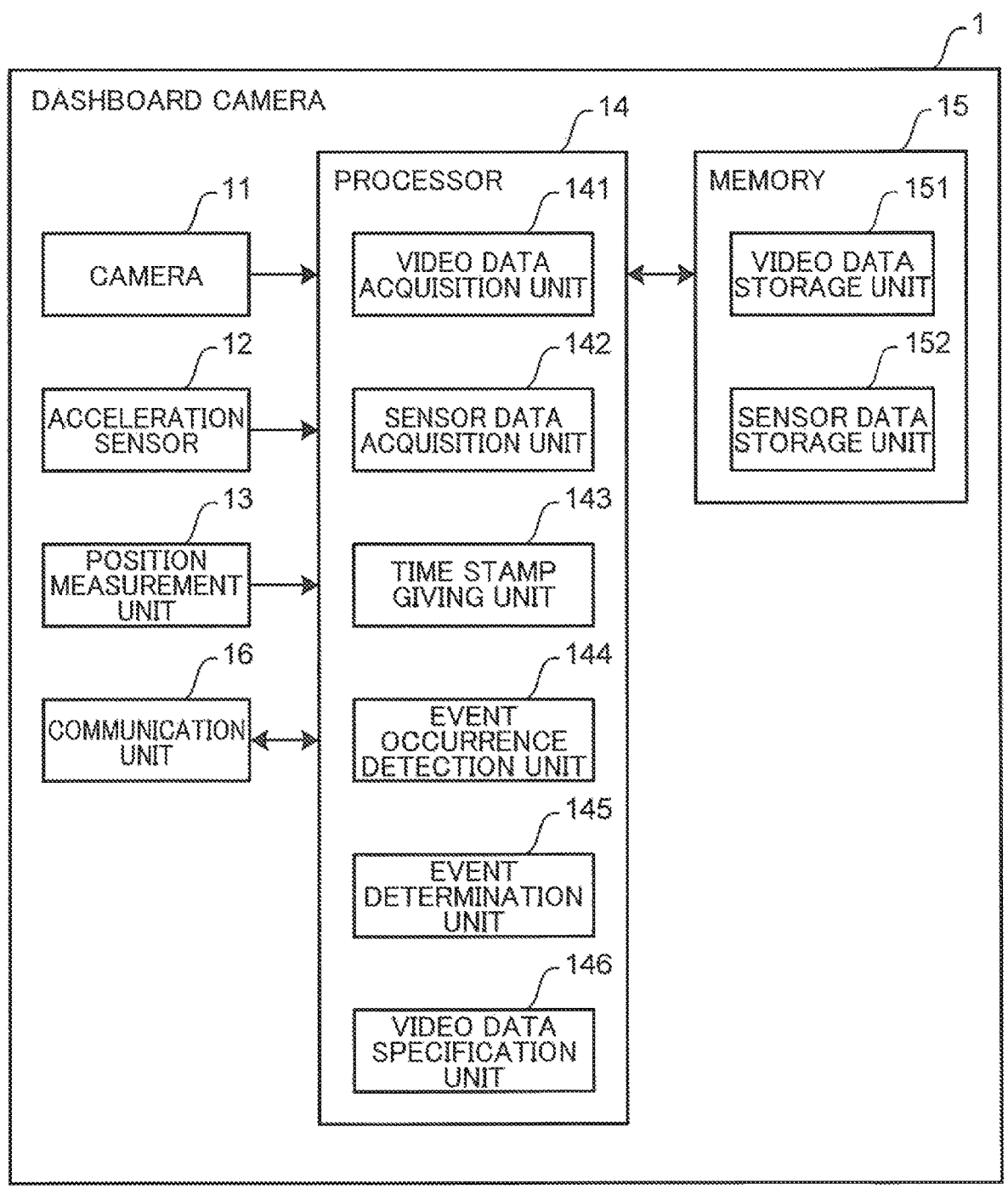
FIG. 2 is a block diagram showing a configuration of a dashboard camera according to the first embodiment.

FIG. 2 is a block diagram showing the configuration of the dashboard camera according to the first embodiment.

The dashboard camera 1 is attached to the windshield or dashboard of a vehicle, for example. The dashboard camera 1 includes a camera 11, an acceleration sensor 12, a position measurement unit 13, a processor 14, a memory 15, and a communication unit 16.

The camera 11 captures the surroundings of the vehicle. Specifically, the camera 11 captures the front of the vehicle. The camera 11 may capture the left, right, and rear sides of the vehicle.

The acceleration sensor 12 is, for example, a 3-axis acceleration sensor, and measures acceleration in the X-axis direction indicating the right-left direction of the vehicle, the Y-axis direction indicating the front-rear direction of the vehicle, and the Z-axis direction indicating the vertical direction of the vehicle.

The position measurement unit 13 is, for example, a global positioning system (GPS) receiver, and measures the position information of the dashboard camera 1, i.e., the position information of the vehicle. The position information is expressed by latitude and longitude. The position information measured by the position measurement unit 13 is used to calculate the speed of the vehicle. For example, if the distance between a first position and a second position and the movement time from the first position to the second position are known, the movement speed of the vehicle from the first position to the second position can be calculated.

The processor 14 is, for example, a central processing unit (CPU), and includes a video data acquisition unit 141, a sensor data acquisition unit 142, a time stamp giving unit 143, an event occurrence detection unit 144, an event determination unit 145, and a video data specification unit 146.

The memory 15 is, for example, a semiconductor memory, and includes a video data storage unit 151 and a sensor data storage unit 152.

The video data acquisition unit 141 acquires video data from the camera 11.

The sensor data acquisition unit 142 acquires sensor data including at least one of the acceleration, speed, and angular velocity of the vehicle. The sensor data acquisition unit 142 acquires the acceleration of the vehicle from the acceleration sensor 12. The sensor data acquisition unit 142 acquires the position information of the vehicle from the position measurement unit 13, and calculates the speed of the vehicle based on the acquired position information.

In the first embodiment, the dashboard camera 1 may include a gyro sensor that measures the angular velocity. The sensor data acquisition unit 142 may acquire the angular velocity from the gyro sensor.

In the first embodiment, the sensor data acquisition unit 142 acquires the acceleration and speed of the vehicle, but the present disclosure is not particularly limited thereto, and the sensor data acquisition unit 142 may acquire only the acceleration of the vehicle. While the sensor data acquisition unit 142 may acquire any one of the acceleration in the X-axis direction, the acceleration in the Y-axis direction, and the acceleration in the Z-axis direction, it is preferable to acquire the acceleration in the X-axis direction, the acceleration in the Y-axis direction, and the acceleration in the Z-axis direction.

In the first embodiment, the sensor data acquisition unit 142 calculates the speed of the vehicle from the position information of the vehicle acquired from the position measurement unit 13, but the present disclosure is not particularly limited thereto, and the speed may be acquired directly from the vehicle. In this case, the dashboard camera 1 may not include the position measurement unit 13.

The time stamp giving unit 143 gives a time stamp (time information) indicating time of acquisition to each of the acquired video data and sensor data. The time stamp giving unit 143 stores time-stamped video data in the video data storage unit 151, and stores time-stamped sensor data in the sensor data storage unit 152.

The video data storage unit 151 stores video data acquired by the video data acquisition unit 141 and time-stamped by the time stamp giving unit 143.

The sensor data storage unit 152 stores sensor data acquired by the sensor data acquisition unit 142 and time-stamped by the time stamp giving unit 143.

The event occurrence detection unit 144 determines whether or not an event has occurred based on sensor data acquired by the sensor data acquisition unit 142. Specifically, when at least one of the acceleration in the X-axis, the acceleration in the Y-axis, and the acceleration in the Z-axis exceeds a threshold value, the event occurrence detection unit 144 determines that an event has occurred.

The communication unit 16 transmits sensor data to the data analysis server 2 when the event occurrence detection unit 144 determines that an event has occurred. At this time, the communication unit 16 transmits, to the data analysis server 2, the sensor data group for a predetermined period based on the time point when the event occurred. More specifically, the communication unit 16 transmits, to the data analysis server 2, a sensor data group of the third period including the first period from the time point when the event occurred to a predetermined time before and the second period from the time point when the event occurred to a predetermined time later. For example, the communication unit 16 transmits, to the data analysis server 2, a sensor data group of the third period including the first period from the time point when the event occurred to 10 seconds before and the second period from the time point when the event occurred to 5 seconds later.

The communication unit 16 receives an identification result of the content of the event transmitted by the data analysis server 2.

The event determination unit 145 determines whether or not the event identified by the data analysis server 2 is a predetermined event. The event determination unit 145 determines whether or not the event indicated by the identification result received by the communication unit 16 is a predetermined event. Here, the predetermined event includes at least one of an event indicating dangerous driving, an event indicating collision of the vehicle, an event indicating a road maintenance state, and an event indicating a malfunction of the vehicle.

When the identified event is determined to be the predetermined event, the video data specification unit 146 specifies video data to which a time stamp (time information) same as the time stamp (time information) given to the sensor data used for the identification is given. That is, when the event determination unit 145 determines that the occurred event is the predetermined event, the video data specification unit 146 specifies a video data group to which time stamp same as the time stamp given to the sensor data group used for the identification is given.

The communication unit 16 transmits the video data specified by the video data specification unit 146 to the video accumulation server 3. That is, the communication unit 16 transmits the video data group specified by the video data specification unit 146 to the video accumulation server 3.

Figure 3:
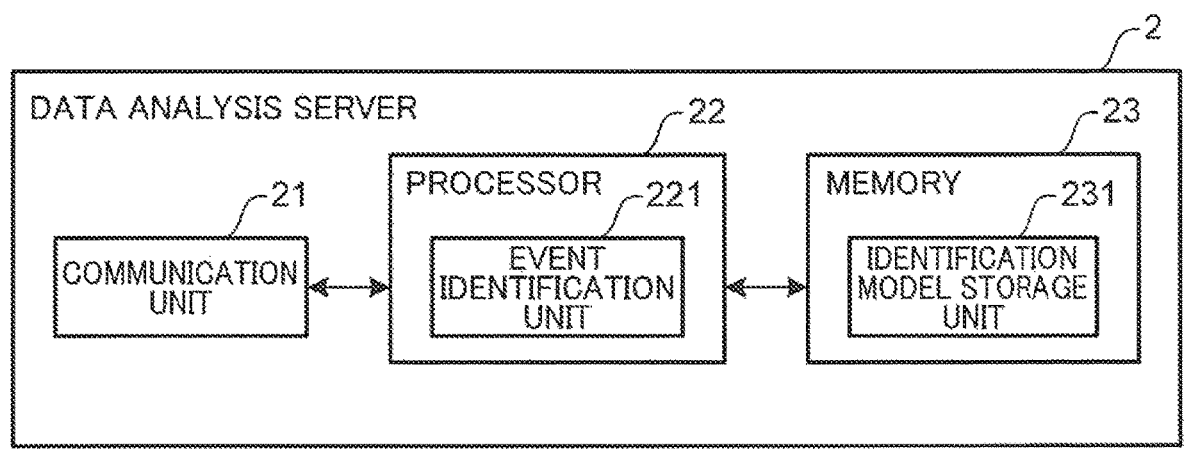
FIG. 3 is a block diagram showing a configuration of a data analysis server according to the first embodiment.

FIG. 3 is a block diagram showing the configuration of the data analysis server according to the first embodiment.

The data analysis server includes a communication unit 21, a processor 22, and a memory 23.

The communication unit 21 receives sensor data transmitted by the dashboard camera 1. That is, the communication unit 21 receives a sensor data group transmitted by the dashboard camera 1.

The processor 22 is, for example, a CPU, and includes an event identification unit 221.

The memory 23 is, for example, a semiconductor memory or a hard disk drive, and includes an identification model storage unit 231.

The identification model storage unit 231 stores in advance an identification model generated by machine learning with sensor data as input and the content of an event as output. As the machine learning, for example, deep learning using a multilayer neural network is used.

The event identification unit 221 identifies the content of the event occurred in the vehicle based on the sensor data. The event identification unit 221 identifies the content of the event by inputting sensor data to an identification model stored in the identification model storage unit 231. The event identification unit 221 inputs a sensor data group into an identification model, and acquires, as an identification result, the content of the event output from the identification model.

In the first embodiment, the event identification unit 221 identifies the content of the event by inputting the sensor data group into the machine-learned identification model, but the present disclosure is not particularly limited thereto, and the memory 23 may store the content of the event and waveform data indicating the waveform of the sensor data group in association with each other. In this case, the event identification unit 221 may perform pattern matching between the waveform of the received sensor data group and the waveform data stored in the memory 23, and acquire, as an identification result, the content of the event associated with the coincident waveform data.

In the first embodiment, the identification model storage unit 231 may store a plurality of identification models in accordance with the content of the event to be identified. For example, the identification model storage unit 231 may store a first identification model for identifying a dangerous driving event and a second identification model for identifying a collision event.

The communication unit 21 transmits the identification result by the event identification unit 221 to the dashboard camera 1.

Figure 4:
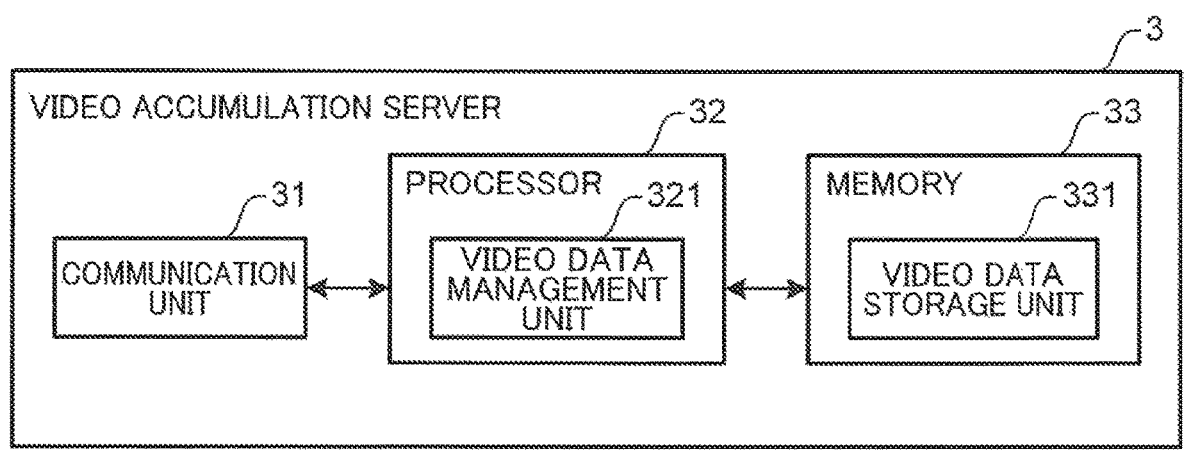
FIG. 4 is a block diagram showing a configuration of a video accumulation server according to the first embodiment.

FIG. 4 is a block diagram showing the configuration of the video accumulation server according to the first embodiment.

The video accumulation server 3 includes a communication unit 31, a processor 32, and a memory 33.

The communication unit 31 receives video data transmitted by the dashboard camera 1.

The video data transmitted by the dashboard camera 1 is video data acquired based on a time point when a predetermined event occurred.

The processor 32 is, for example, a CPU, and includes a video data management unit 321.

The video data management unit 321 stores the video data received by the communication unit 31 in a video data storage unit 331. That is, the video data management unit 321 stores, in the video data storage unit 331, the video data group acquired based on the time point when the predetermined event occurred.

The memory 33 is, for example, a semiconductor memory or a hard disk drive, and includes the video data storage unit 331.

The video data storage unit 331 stores video data. The video data stored in the video data storage unit 331 is video data acquired based on a time point when a predetermined event occurred. The video data is used for driving evaluation, dynamic state management, or support of safe driving, for example.

Figure 5:
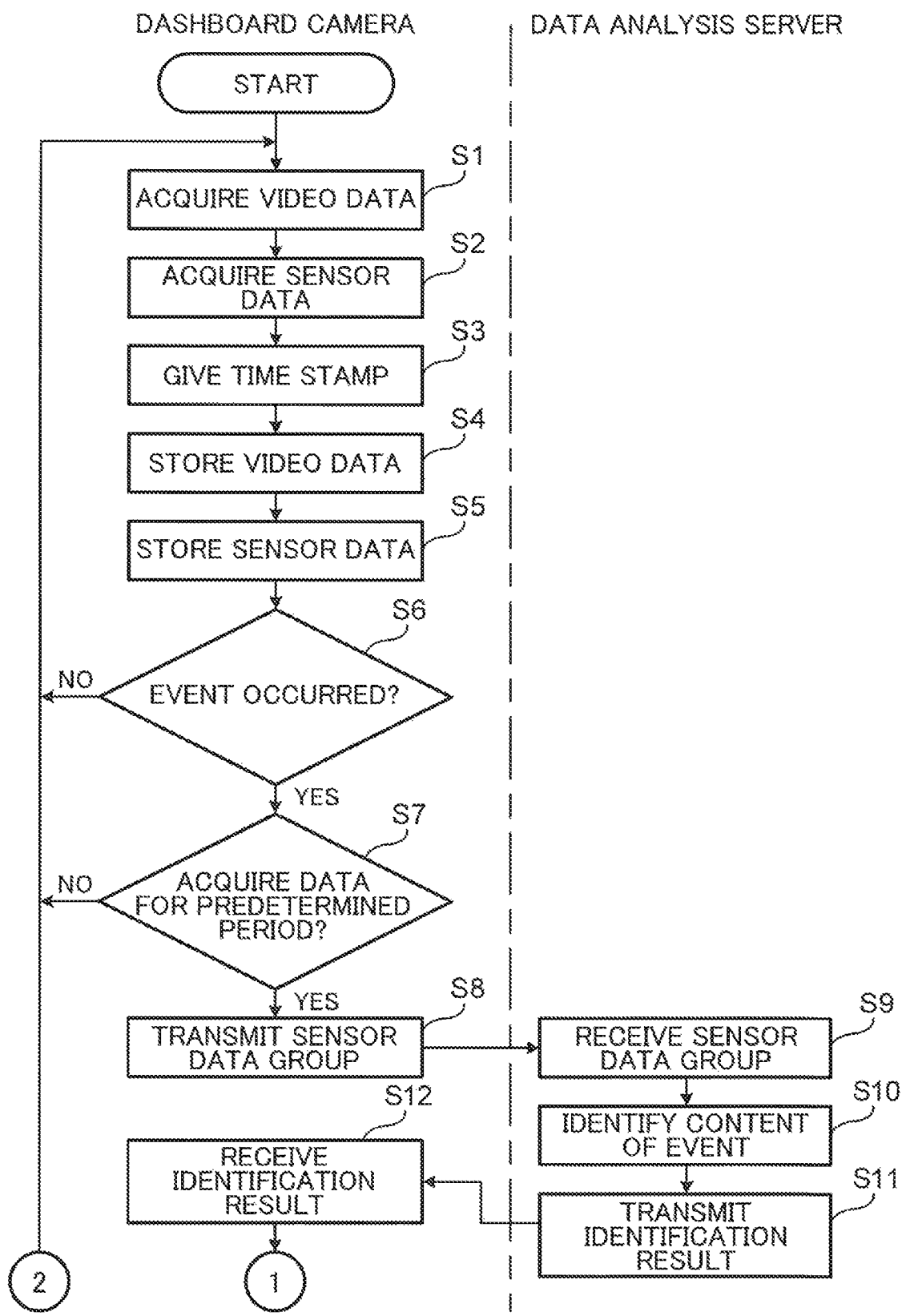
FIG. 5 is a first flowchart for explaining the processing of the information processing system according to the first embodiment.
Figure 6:
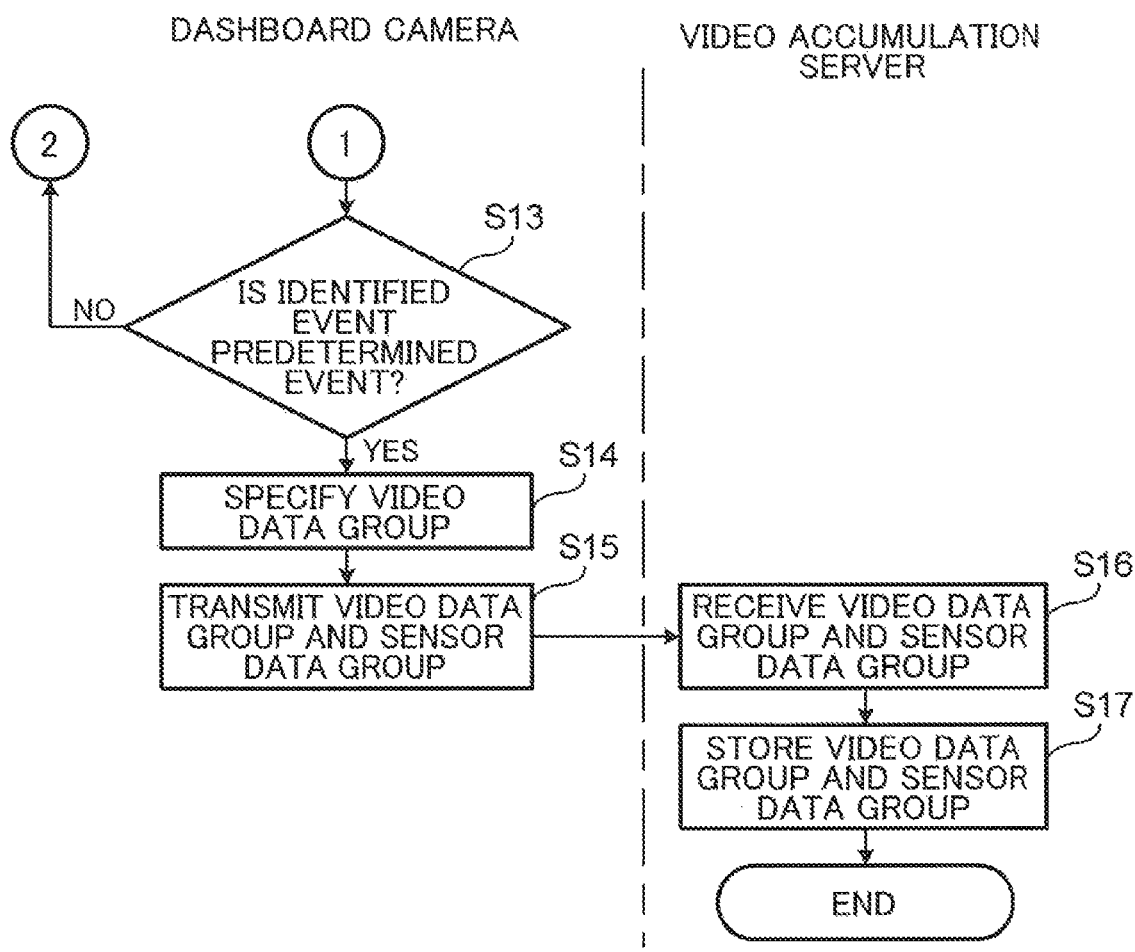
FIG. 6 is a second flowchart for explaining the processing of the information processing system according to the first embodiment.

FIG. 5 is a first flowchart for explaining the processing of the information processing system according to the first embodiment, and FIG. 6 is a second flowchart for explaining the processing of the information processing system according to the first embodiment.

First, in step S1, the video data acquisition unit 141 of the dashboard camera 1 acquires video data from the camera 11.

Next, in step S2, the sensor data acquisition unit 142 acquires sensor data including the acceleration and speed of the vehicle. At this time, the sensor data acquisition unit 142 acquires the acceleration in the X-axis direction, the acceleration in the Y-axis direction, and the acceleration in the Z-axis direction from the acceleration sensor 12. The sensor data acquisition unit 142 acquires the position of the vehicle from the position measurement unit 13, calculates the distance between the currently acquired position and the previously acquired position, and divides the calculated distance by the acquisition time interval, thereby calculating the speed of the vehicle.

Next, in step S3, the time stamp giving unit 143 gives a time stamp indicating time of acquisition to each of the video data acquired by the video data acquisition unit 141 and the sensor data acquired by the sensor data acquisition unit 142.

Next, in step S4, the time stamp giving unit 143 stores the time-stamped video data in the video data storage unit 151.

Next, in step S5, the time stamp giving unit 143 stores the time-stamped sensor data in the sensor data storage unit 152.

Next, in step S5, the event occurrence detection unit 144 determines whether or not an event has occurred based on the sensor data acquired by the sensor data acquisition unit 142. At this time, the event occurrence detection unit 144 determines whether or not at least one of the acceleration in the X-axis, the acceleration in the Y-axis, and the acceleration in the Z-axis has exceeded a threshold value. Then, when determining that none of the acceleration in the X axis, the acceleration in the Y axis, and the acceleration in the Z axis has exceeded the threshold value, the event occurrence detection unit 144 determines that no event has occurred. When determining that at least one of the acceleration in the X-axis, the acceleration in the Y-axis, and the acceleration in the Z-axis has exceeded the threshold value, the event occurrence detection unit 144 determines that an event has occurred.

Here, when it is determined that no event has occurred (NO in step S6), the process returns to step S1.

On the other hand, when it is determined that an event has occurred (YES in step S6), the event occurrence detection unit 144 determines in step S7 whether or not the video data and sensor data for a predetermined period have been acquired. Here, the predetermined period is a period in which a first period from the time point when the event occurred to a predetermined time before and a second period from the time point when the event occurred to a predetermined time later are put together. For example, the event occurrence detection unit 144 determines whether or not the video data and sensor data for 15 seconds, in which the first period from the time point when the event occurred to 10 seconds before and the second period from the time point when the event occurred to 5 seconds after are put together, have been acquired.

Here, when it is determined that the video data and sensor data for the predetermined period have not been acquired (NO in step S7), the process returns to step S1.

On the other hand, when it is determined that the video data and sensor data for the predetermined period have been acquired (YES in step S7), the communication unit 16 transmits in step S8 the sensor data group acquired in the predetermined period to the data analysis server 2.

Next, in step S9, the communication unit 21 of the data analysis server 2 receives the sensor data group transmitted by the dashboard camera 1.

Next, in step S10, the event identification unit 221 identifies the content of the event occurred in the vehicle based on the sensor data group received by the communication unit 21. At this time, the event identification unit 221 inputs the sensor data group to the identification model stored in the identification model storage unit 231, and acquires, as an identification result, the content of the event output from the identification model.

Next, in step S11, the communication unit 21 transmits the identification result of the event content by the event identification unit 221 to the dashboard camera 1.

Next, in step S12, the communication unit 16 of the dashboard camera 1 receives the identification result of the event content transmitted by the data analysis server 2.

Next, in step S13, the event determination unit 145 determines whether or not the identified event is a predetermined event based on the identification result received by the communication unit 16. At this time, the predetermined event differs depending on the video data, occurring at what kind of event, the video accumulation server 3 collects.

For example, if the predetermined event is an event indicating dangerous driving, the event determination unit 145 determines whether or not the identified event is any of an event indicating dangerous driving, i.e., an event indicating sudden braking, an event indicating sudden steering, and an event indicating sudden acceleration.

For example, if the predetermined event is an event indicating collision, the event determination unit 145 determines whether or not the identified event is an event indicating collision.

For example, if the predetermined event is an event indicating a road maintenance state, the event determination unit 145 determines whether or not the identified event is an event indicating a road defect. When it is determined that the predetermined event is an event indicating the road maintenance state, it is preferable to include position information in the sensor data. This makes it possible to specify the position where the road is defective.

For example, if the predetermined event is an event indicating a malfunction of the vehicle, the event determination unit 145 determines whether or not the identified event is an event indicating a malfunction of the vehicle. The malfunction of the vehicle includes a state where the tire air pressure of the vehicle is low, for example. In this case, the memory 23 may store in advance the position identified as having passed through a hump on the road based on the sensor data of another vehicle. Then, when it is identified that the vehicle has passed through a hump on the road even though no other vehicle has passed through the hump on the road, the event identification unit 221 may determine that the tire air pressure of the vehicle is low.

Here, when it is determined that the identified event is not the predetermined event (NO in step S13), the process returns to step S1.

On the other hand, when it is determined that the identified event is the predetermined event (YES in step S13), the video data specification unit 146 specifies in step S14, from the video data storage unit 151, a video data group to which the time stamp same as the time stamp given to the sensor data group used for the identification is given.

Next, in step S15, the communication unit 16 transmits, to the video accumulation server 3, the video data group specified by the video data specification unit 146 and the sensor data group used for the identification.

Next, in step S16, the communication unit 31 of the video accumulation server 3 receives the video data group and the sensor data group transmitted by the dashboard camera 1.

Next, in step S17, the video data management unit 321 stores, in the video data storage unit 331, the video data group and the sensor data group received by the communication unit 31.

According to the first embodiment, since the content of an event occurred in the vehicle is identified based on sensor data having a smaller amount of data than video data, the processing load of the information processing system can be reduced. Since only the video data when a predetermined event occurred is transmitted, unnecessary video data is prevented from being transmitted, and the data communication amount and data communication cost can be reduced.

In the first embodiment, the information processing system includes the data analysis server 2 and the video accumulation server 3, but the present disclosure is not particularly limited thereto, and may include one server that includes the functions of the data analysis server 2 and the video accumulation server 3. In this case, since the server has already acquired the sensor data group, the communication unit 16 of the dashboard camera 1 transmits in step S15 only the video data group to the video accumulation server 3. The communication unit 31 of the video accumulation server 3 receives the video data group transmitted by the dashboard camera 1. Then, the video data management unit 321 stores, in the video data storage unit 331, the video data group received by the communication unit 31 and the sensor data group used for the identification.

In the first embodiment, the communication unit 16 of the dashboard camera 1 transmits the video data group and the sensor data group to the video accumulation server 3, but the present disclosure is not particularly limited thereto, and may transmit, to the video accumulation server 3, the identification result of the event, i.e., the content of the event, in addition to the video data group and the sensor data group. The video data management unit 321 of the video accumulation server 3 may store, in the video data storage unit 331, the video data group, the sensor data group, and the identification result of the event that have been received by the communication unit 31.

Subsequently, identification of the event in the first embodiment will be further described.

Figure 7:
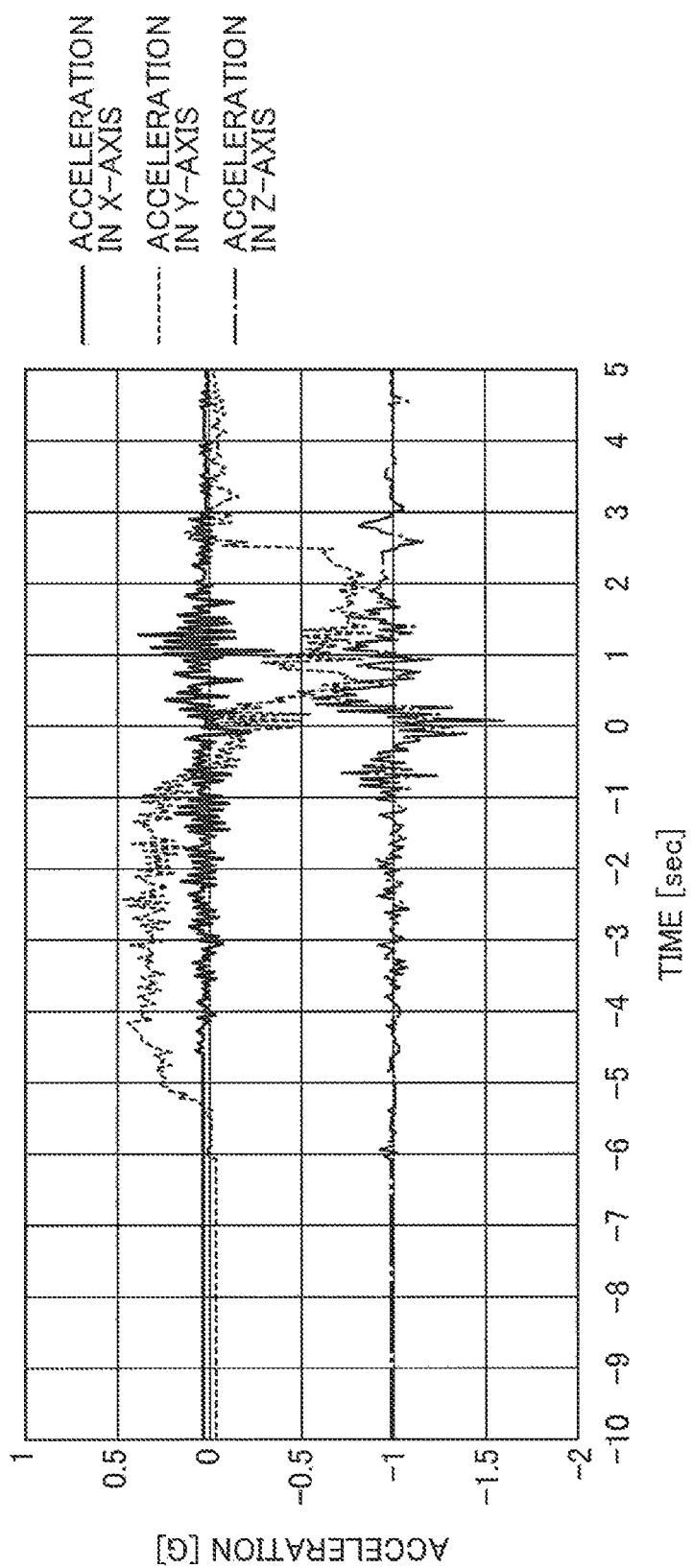
FIG. 7 is a view showing the relationship between the acceleration in the X-axis direction, the Y-axis direction, and the Z-axis direction and the time measured when sudden braking, which is one of dangerous driving events, is performed in the first embodiment.

FIG. 7 is a view showing the relationship between the acceleration in the X-axis direction, the Y-axis direction, and the Z-axis direction and the time measured when sudden braking, which is one of the dangerous driving events, is performed in the first embodiment. In FIG. 7, the vertical axis indicates acceleration [G], and the horizontal axis indicates time [sec]. The solid line indicates acceleration in the X-axis direction, the broken line indicates acceleration in the Y-axis direction, and the chain line indicates acceleration in the Z-axis direction. Time 0 [sec] indicates the time at which the event is determined to have occurred.

As shown in FIG. 7, when the sudden braking is performed, it is determined that the acceleration in the Y-axis direction has exceeded the threshold value, and the sensor data group is transmitted to the data analysis server 2. Then, if the sensor data group shown in FIG. 7 is input to the identification model, an event of sudden braking is identified to have occurred.

Figure 8:
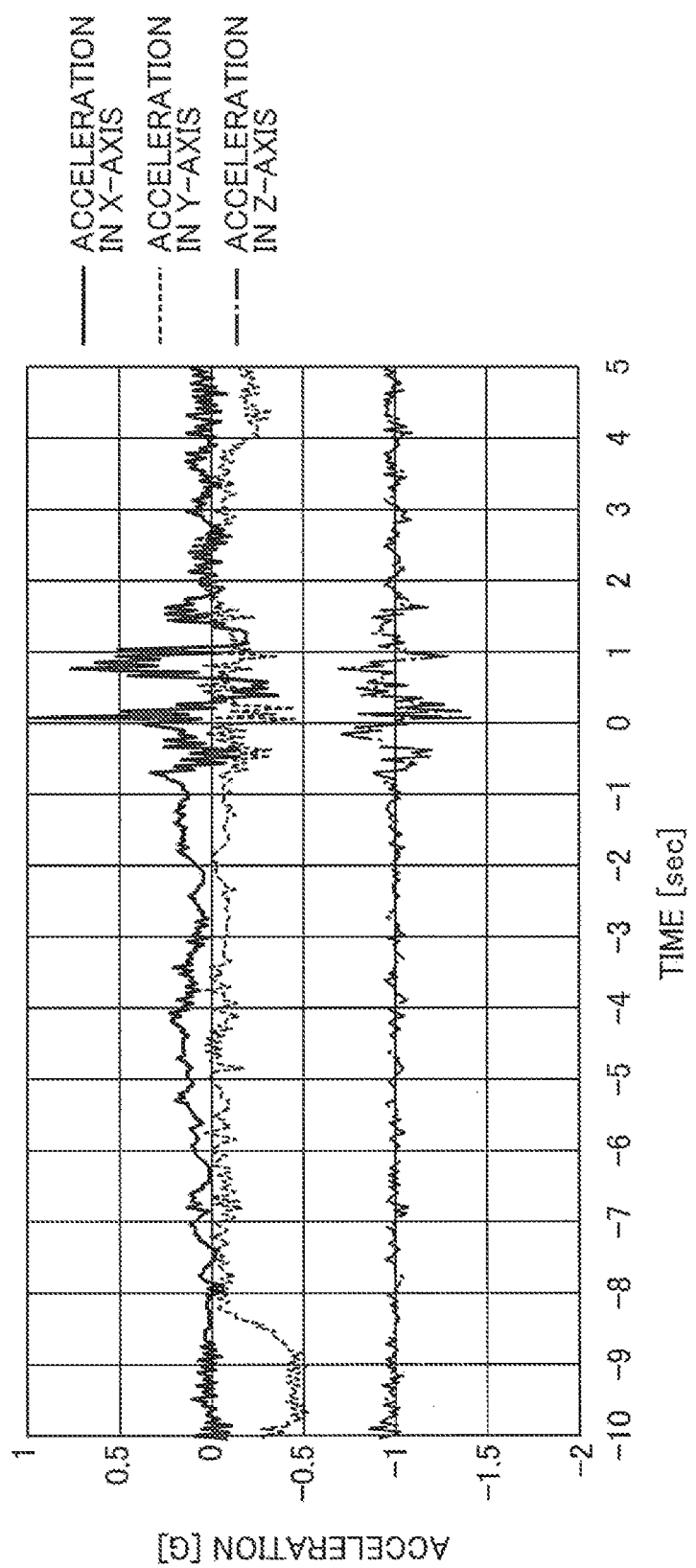
FIG. 8 is a view showing the relationship between the acceleration in the X-axis direction, the Y-axis direction, and the Z-axis direction and the time measured when a vehicle runs on a hump on the road in the first embodiment.

FIG. 8 is a view showing the relationship between the acceleration in the X-axis direction, the Y-axis direction, and the Z-axis direction and the time measured when the vehicle run on a bump on the road in the first embodiment. In FIG. 8, the vertical axis indicates acceleration [G], and the horizontal axis indicates time [sec]. The solid line indicates acceleration in the X-axis direction, the broken line indicates acceleration in the Y-axis direction, and the chain line indicates acceleration in the Z-axis direction. Time 0 [sec] indicates the time at which the event is determined to have occurred.

As shown in FIG. 8, when the vehicle runs on a hump on the road, it is determined that the acceleration in the X-axis direction has exceeded the threshold value, and the sensor data group is transmitted to the data analysis server 2. Then, when the sensor data group shown in FIG. 8 is input to the identification model, it is identified that a normal event has occurred. The video captured when the vehicle runs on the hump on the road is not a video that should be stored in the video accumulation server 3. Therefore, when the sensor data group indicating that the vehicle has run on the hump on the road is input to the identification model, it is identified that a normal event has occurred. The normal event is not the predetermined event. Therefore, if the event indicated by the identification result received by the communication unit 16 is a normal event, the event determination unit 145 determines that the event is not the predetermined event.

When the vehicle moves along a looped road, the steering wheel is continuously turned in one direction, and hence it is determined that the acceleration in the X-axis direction has exceeded the threshold value, and the sensor data group is transmitted to the data analysis server 2. Thus, also when the sensor data group indicating that the vehicle is moving along the looped road is input to the identification model, it is identified that a normal event has occurred.

When the vehicle collides, it is determined that the acceleration in the X-axis direction and the acceleration in the Y-axis direction have exceeded the threshold value, and the sensor data group is transmitted to the data analysis server 2. Then, when this sensor data group is input to the identification model, it is identified that a collision event has occurred.

In the first embodiment, the event identification unit 221 may not only identify the collision event but also identify the degree of collision. That is, the event identification unit 221 may identify as to which of "large", "medium", and "small" the degree of collision is, in accordance with the maximum values of the accelerations in the X-axis direction, the Y-axis direction, and the Z-axis direction.

When the vehicle runs on a hump on the road, it is determined that the acceleration in the X-axis direction has exceeded the threshold value, and the sensor data group is transmitted to the data analysis server 2. Then, when this sensor data group is input to the identification model, it is identified that a normal event has occurred. The video captured when the vehicle runs on the hump on the road is not a video that should be stored in the video accumulation server 3. Therefore, when the sensor data group indicating that the vehicle has run on the hump on the road is input to the identification model, it is identified that a normal event has occurred. The normal event is not the predetermined event. Therefore, if the event indicated by the identification result received by the communication unit 16 is a normal event, the event determination unit 145 determines that the event is not the predetermined event.

In the first embodiment, the sensor data includes the 3-axis acceleration and speed, but the present disclosure is not particularly limited thereto, and may include data indicating the presence or absence of braking, data indicating the presence or absence of a right turn signaling, and data indicating the presence or absence of a left turn signaling.

The information processing system according to the first embodiment includes the dashboard camera 1, the data analysis server 2, and the video accumulation server 3, but the present disclosure is not particularly limited thereto, and may not include the data analysis server 2 but include the dashboard camera 1 and the video accumulation server 3. In this case, the dashboard camera 1 may include the event identification unit and the identification model storage unit of the data analysis server 2. In this case, when the event occurrence detection unit 144 determines that an event has occurred, the event identification unit identifies the content of the event occurred in the vehicle based on the sensor data.

Second Embodiment

The information processing system of the first embodiment includes the dashboard camera 1 fixed to the vehicle in advance, but the information processing system of the second embodiment includes a mobile terminal attachable and detachable to and from the vehicle in place of the dashboard camera 1.

Figure 9:
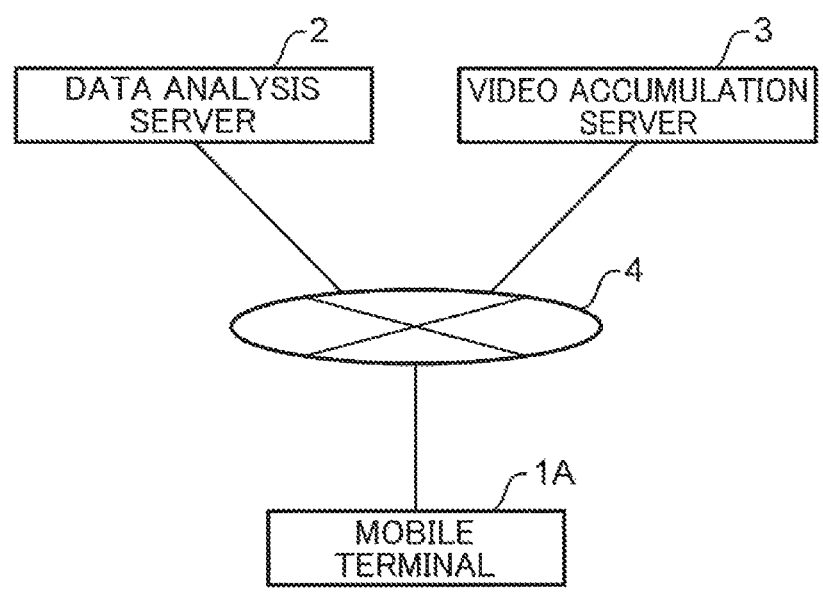
FIG. 9 is a diagram conceptually showing the overall configuration of an information processing system according to a second embodiment.

FIG. 9 is a diagram conceptually showing the overall configuration of the information processing system according to the second embodiment.

The information processing system shown in FIG. 9 includes a mobile terminal 1A, the data analysis server 2, and the video accumulation server 3. The mobile terminal 1A is an example of a terminal device and is attachable and detachable to and from the vehicle. The data analysis server 2 is communicably connected with the mobile terminal 1A via the network 4. The video accumulation server 3 is communicably connected with the mobile terminal 1A via the network 4. Note that in the second embodiment, the same components as those in the first embodiment are given the same reference numerals and descriptions thereof are omitted.

Since the dashboard camera 1 of the first embodiment is fixed to the vehicle, the attitude of the dashboard camera 1 with respect to the vehicle does not change. On the other hand, since the mobile terminal 1A of the second embodiment is attachable and detachable, the attitude of the mobile terminal 1A with respect to the vehicle is likely to change every time the mobile terminal 1A is attached to the vehicle. Therefore, the mobile terminal 1A acquires the attitude of the mobile terminal 1A and corrects the acquired sensor data based on the acquired attitude.

Figure 10:
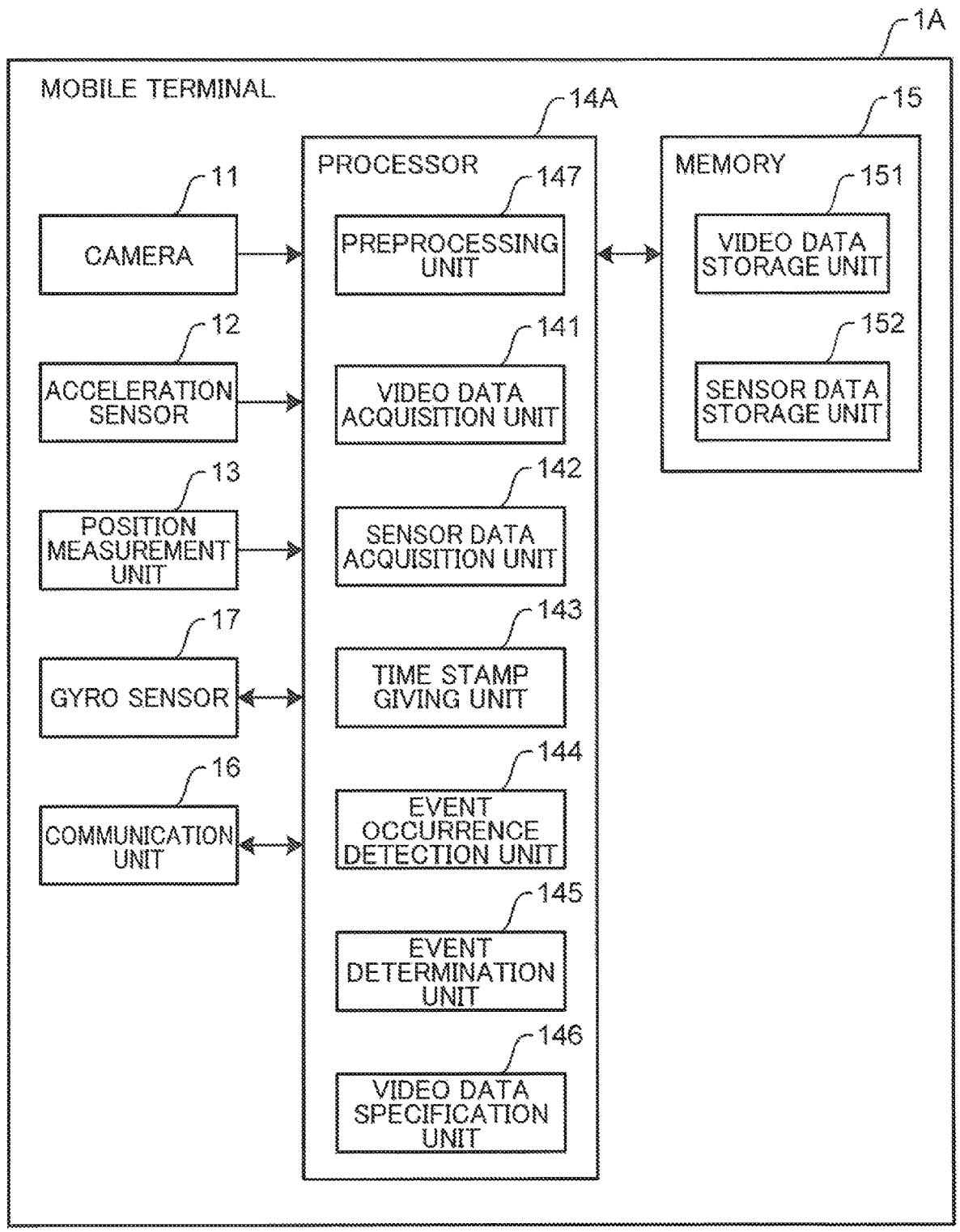
FIG. 10 is a block diagram showing a configuration of a mobile terminal according to the second embodiment.

FIG. 10 is a block diagram showing the configuration of the mobile terminal according to the second embodiment.

The mobile terminal 1A is a smartphone, for example. The mobile terminal 1A is attached to the dashboard of a vehicle, for example. The mobile terminal 1A includes the camera 11, the acceleration sensor 12, the position measurement unit 13, a processor 14A, the memory 15, the communication unit 16, and a gyro sensor 17.

The gyro sensor 17 detects the attitude of the mobile terminal 1A. The attitude of the mobile terminal 1A is expressed by the angular velocity of the mobile terminal 1A. The gyro sensor 17 is, for example, a 3-axis gyro sensor, and detects the angular velocity about the X-axis, the angular velocity about the Y-axis, and the angular velocity about the Z-axis of the mobile terminal 1A.

The processor 14A is, for example, a CPU, and includes the video data acquisition unit 141, the sensor data acquisition unit 142, the time stamp giving unit 143, the event occurrence detection unit 144, the event determination unit 145, the video data specification unit 146, and a preprocessing unit 147.

The preprocessing unit 147 acquires the attitude of the mobile terminal 1A from the gyro sensor 17. That is, the preprocessing unit 147 acquires, from the gyro sensor 17, the angular velocity about the X-axis, the angular velocity about the Y-axis, and the angular velocity about the Z-axis of the mobile terminal 1A. The preprocessing unit 147 corrects the acquired sensor data based on the acquired attitude. The mobile terminal 1A has a mounting attitude serving as a reference. Based on the acquired angular velocities about the X-axis, the Y-axis, and the Z-axis of the mobile terminal 1A, the preprocessing unit 147 calculates how much the mobile terminal 1A is inclined about the X-axis, the Y-axis, and the Z-axis from the reference attitude. Then, the preprocessing unit 147 corrects the accelerations in the X-axis direction, Y-axis direction, and Z-axis direction detected by the acceleration sensor 12 in accordance with the calculated inclination angle.

The time stamp giving unit 143 gives a time stamp indicating time of acquisition to each of the video data acquired by the video data acquisition unit 141 and the sensor data corrected by the preprocessing unit 147.

Figure 11:
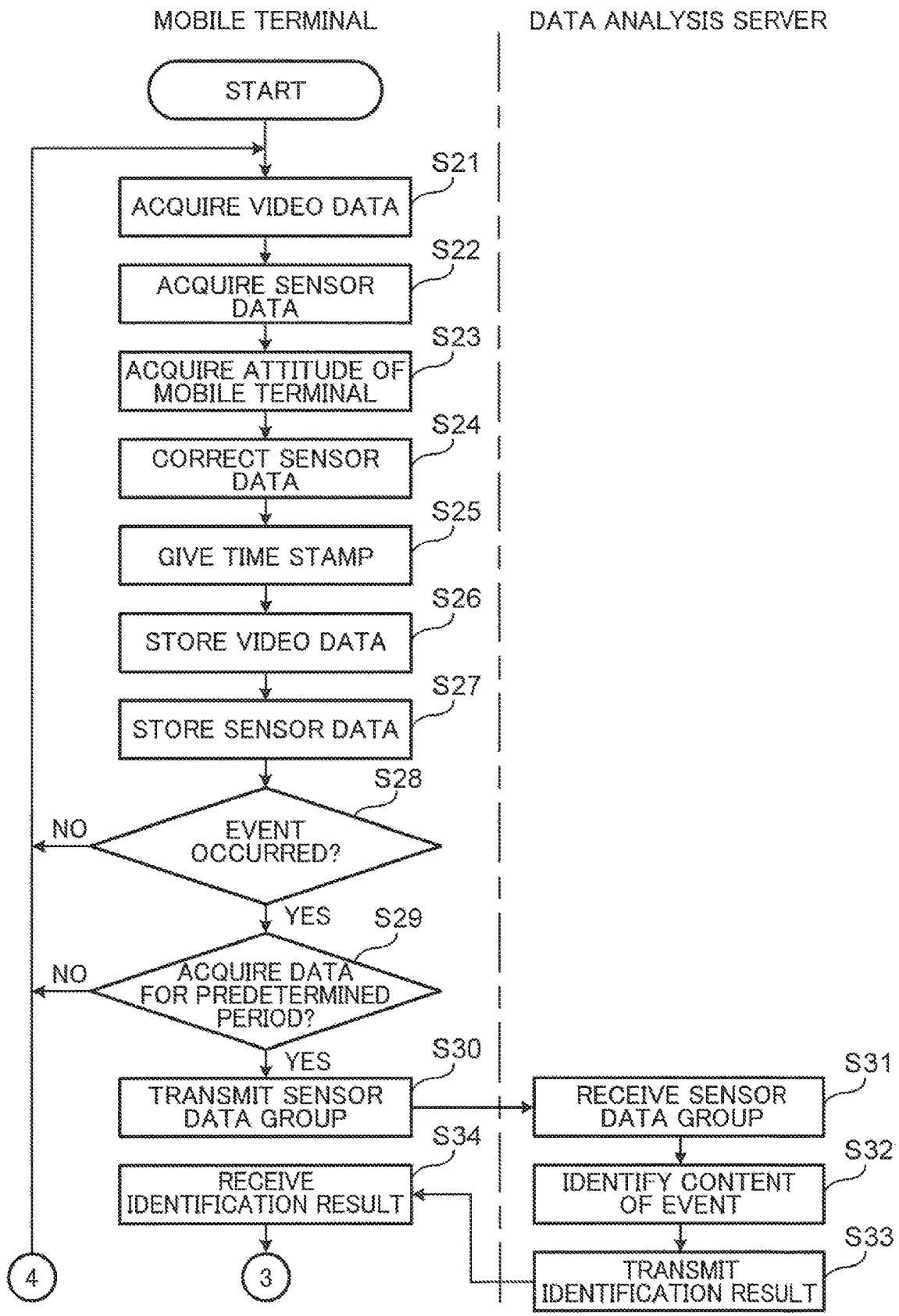
FIG. 11 is a first flowchart for explaining the processing of the information processing system according to the second embodiment.
Figure 12:
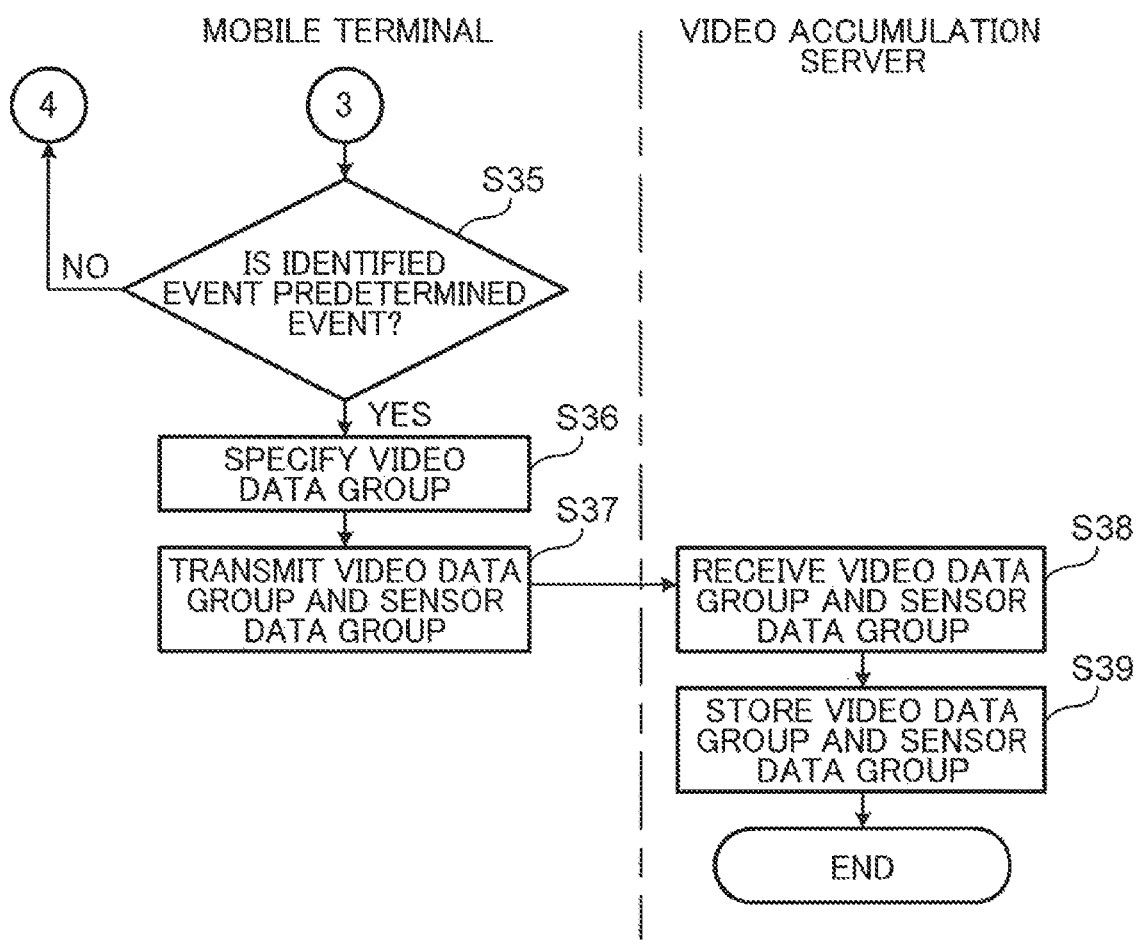
FIG. 12 is a second flowchart for explaining the processing of the information processing system according to the second embodiment.

FIG. 11 is the first flowchart for explaining the processing of the information processing system according to the second embodiment, and FIG. 12 is the second flowchart for explaining the processing of the information processing system according to the second embodiment.

Since the processing in steps S21 and S22 shown in FIG. 11 is the same as the processing in steps S1 and S2 shown in FIG. 5, the description thereof is omitted.

Next, in step S23, the preprocessing unit 147 of the mobile terminal 1A acquires the attitude of the mobile terminal 1A from the gyro sensor 17. At this time, the preprocessing unit 147 acquires, from the gyro sensor 17, the angular velocity about the X-axis, the angular velocity about the Y-axis, and the angular velocity about the Z-axis of the mobile terminal 1A.

Next, in step S24, the preprocessing unit 147 corrects the sensor data acquired by the sensor data acquisition unit 142 based on the acquired attitude of the mobile terminal 1A. Specifically, the preprocessing unit 147 corrects the accelerations in the X-axis direction, the Y-axis direction and the Z-axis direction acquired by the sensor data acquisition unit 142 based on the acquired angular velocities about the X-axis, about the Y-axis, and about the Z-axis of the mobile terminal 1A.

Next, in step S25, the time stamp giving unit 143 gives a time stamp indicating time of acquisition to each of the video data acquired by the video data acquisition unit 141 and the sensor data corrected by the preprocessing unit 147.

Since the processing in steps S26 shown in FIGS. 11 to S39 shown in FIG. 12 is the same as the processing in steps S4 shown in FIGS. 5 to S17 shown in FIG. 6, the description thereof is omitted.

In the present embodiment, every time the mobile terminal 1A acquires the sensor data, the mobile terminal 1A acquires the attitude of the mobile terminal 1A and corrects the sensor data, but the present disclosure is not particularly limited thereto. The mobile terminal 1A may acquire the attitude of the mobile terminal 1A before acquiring the sensor data first. Then, every time the mobile terminal 1A acquires sensor data, the mobile terminal 1A may correct the sensor data by using the attitude of the mobile terminal LA acquired first.

In each of the above embodiments, each component may be implemented by being configured with dedicated hardware or by executing a software program suitable for each component. Each component may be implemented by a program execution unit such as a CPU or a processor reading and executing a software program recorded in a recording medium such as a hard disk or a semiconductor memory.

Some or all of the functions of the device according to the embodiments of the present disclosure are implemented as large scale integration (LSI), which is typically an integrated circuit. These may be individually integrated into one chip, or integrated into one chip so as to include some or all of them. The integrated circuit is not limited to an LSI, and may be implemented by a dedicated circuit or a general-purpose processor. A field programmable gate array (FPGA), which can be programmed after LSI manufacturing, or a reconfigurable processor, which can reconfigure the connections and settings of circuit cells inside the LSI, may be used.

Some or all of the functions of the device according to the embodiments of the present disclosure may be implemented by a processor such as a CPU executing a program.

The numerals used above are all illustrated for specifically explaining the present disclosure, and the present disclosure is not limited to the illustrated numerals.

The order of executing the steps shown in the flowcharts is for illustrative purposes in order to specifically explain the present disclosure, and the order may be other than that described above within a range where similar effects can be obtained, Some of the steps described above may be executed simultaneously (parallel) with other steps.

INDUSTRIAL APPLICABILITY

Since the technique according to the present disclosure can reduce the processing load of the information processing system, the technique is useful in a technique of processing sensor data acquired by a sensor installed in a vehicle.

The invention claimed is:

1. An information processing method in an information processing system, the information processing method comprising:
    acquiring video data from a camera that captures surroundings of a vehicle;
    acquiring sensor data including at least one of an acceleration, a speed, or an angular velocity of the vehicle from a mobile terminal detachably attached to the vehicle;
    acquiring an attitude of the mobile terminal;
    correcting the sensor data based on the attitude;
    giving time information indicating a time of acquisition to each of the video data and the sensor data;
    identifying a content of an event occurred in the vehicle based on the sensor data;
    determining whether or not the identified event is a predetermined event;
    when the identified event is determined to be the predetermined event, specifying video data to which time information same as the time information given to the sensor data used for identification is given; and
    transmitting the specified video data.

2. The information processing method according to claim 1, wherein the content of the event is identified by inputting the sensor data to an identification model generated by machine learning with the sensor data as an input and the content of the event as an output.

3. The information processing method according to claim 1, wherein the predetermined event includes at least one of an event indicating dangerous driving, an event indicating collision of the vehicle, an event indicating a road maintenance state, or an event indicating a malfunction of the vehicle.

4. The information processing method according to claim 1, further comprising:
    determining whether or not the event has occurred based on the sensor data, wherein
    when a determination is made that the event has occurred, the content of the event occurred in the vehicle is identified based on the sensor data.

5. The information processing method according to claim 1, wherein
    the information processing system includes a terminal device mounted on the vehicle and a server communicably connected to the terminal device,
    the terminal device transmits the acquired sensor data to the server,
    the server receives the sensor data,
    the server identifies the content of the event occurred in the vehicle based on the sensor data, the server transmits an identification result of the identifying, the terminal device receives the identification result transmitted by the server, and in the determining, the terminal device determines whether or not the identified event indicated by the identification result is the predetermined event.

6. An information processing device, comprising:

a processor; and a memory including a program that, when executed by the processor, causes the processor to perform operations, the operations including:

acquiring video data from a camera that captures surroundings of a vehicle;

acquiring sensor data including at least one of an acceleration, a speed, or an angular velocity of the vehicle from a mobile terminal detachably attached to the vehicle;

acquiring an attitude of the mobile terminal;

correcting the sensor data based on the attitude;

giving time information indicating a time of acquisition to each of the video data and the sensor data;

identifying a content of an event occurred in the vehicle based on the sensor data;

determining whether or not the identified event is a predetermined event;

specifying video data to which time information same as the time information given to the sensor data used for identification is given, when the identified event is determined to be the predetermined event; and transmitting the specified video data.

7. A non-transitory computer-readable recording medium recording an information processing program, the information processing program, when executed by a computer, causing the computer to perform functions, the functions comprising:

acquiring video data from a camera that captures surroundings of a vehicle;

acquiring sensor data including at least one of an acceleration, a speed, or an angular velocity of the vehicle from a mobile terminal detachably attached to the vehicle;

acquiring an attitude of the mobile terminal;

correcting the sensor data based on the attitude;

giving time information indicating a time of acquisition to each of the video data and the sensor data;

identifying a content of an event occurred in the vehicle based on the sensor data;

determining whether or not the identified event is a predetermined event;

specifying video data to which time information same as the time information given to the sensor data used for identification is given, when the identified event is determined to be the predetermined event; and transmitting the specified video data.

8. An information processing system, comprising:

a mobile terminal detachably attached to a vehicle;

a data analysis server communicably connected with the mobile terminal; and a video accumulation server communicably connected with the mobile terminal, wherein the mobile terminal acquires video data from a camera that captures surroundings of the vehicle, acquires sensor data including at least one of an acceleration, a speed, or an angular velocity of the vehicle, acquires an attitude of the mobile terminal;

corrects the sensor data based on the attitude;

gives time information indicating a time of acquisition to each of the video data and the sensor data; and transmits the sensor data to the data analysis server when an event occurs in the vehicle, the data analysis server receives the sensor data transmitted by the mobile terminal, identifies a content of the event occurred in the vehicle based on the sensor data, and transmits an identification result, the mobile terminal receives the identification result transmitted by the data analysis server, determines whether or not the identified event indicated by the identification result is a predetermined event, specifies video data to which time information same as the time information given to the sensor data used for identification is given, when the identified event is determined to be the predetermined event, and transmits the specified video data to the video accumulation server, and the video accumulation server receives the video data transmitted by the mobile terminal, and stores the video data.

\* \* \* \* \*